United States Patent
Lee

(10) Patent No.: US 9,842,499 B2
(45) Date of Patent: Dec. 12, 2017

(54) DEVICE ENABLING EXCHANGE OF ABNORMAL SIGNAL AMONG VEHICLES VIA WI-FI DIRECT NETWORK, AND CONTROL METHOD THEREFOR

(71) Applicant: LG ELECTRONICS INC., Seoul (KR)

(72) Inventor: Sungjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/102,779

(22) PCT Filed: Dec. 9, 2014

(86) PCT No.: PCT/KR2014/012065
§ 371 (c)(1),
(2) Date: Jun. 8, 2016

(87) PCT Pub. No.: WO2015/088222
PCT Pub. Date: Jun. 18, 2015

(65) Prior Publication Data
US 2017/0270797 A1  Sep. 21, 2017

Related U.S. Application Data

(60) Provisional application No. 61/913,889, filed on Dec. 9, 2013.

(51) Int. Cl.
*G08G 1/00* (2006.01)
*H04H 20/00* (2009.01)
(Continued)

(52) U.S. Cl.
CPC ............. *G08G 1/162* (2013.01); *G07C 5/008* (2013.01); *G07C 5/0808* (2013.01);
(Continued)

(58) Field of Classification Search
CPC .......... G08G 1/00; H04H 20/00; H04H 20/08; H04H 20/62; H04W 12/06; H04W 12/0045; G01M 17/00
See application file for complete search history.

(56) References Cited

U.S. PATENT DOCUMENTS

2007/0069947 A1    3/2007  Banet et al.
2008/0167758 A1*   7/2008  Louch ..................... H04L 12/66
                                                                  701/2
(Continued)

FOREIGN PATENT DOCUMENTS

KR    10-2001-0019382 A    3/2001
KR    10-2010-0069960 A    6/2010
(Continued)

*Primary Examiner* — Yonel Beaulieu
(74) *Attorney, Agent, or Firm* — Birch, Stewart, Kolasch & Birch, LLP

(57) ABSTRACT

A method of controlling a Wi-Fi device in a vehicle, which includes determining, via a controller of the Wi-Fi device, an abnormal state of the vehicle; adding, via the controller, vendor specific data in a management frame to be transmitted to a different Wi-Fi device in a different vehicle via Wi-Fi Direct based on the determined abnormal state; transmitting, via a wireless communication unit of the Wi-Fi device, the generated vendor specific data to the different Wi-Fi device, wherein the management frame comprises at least one of a probe request frame, a probe response frame, a service request frame and a service response frame, and wherein the management frame is transmitted before an authenticated connection is established between the Wi-Fi device and the different Wi-Fi device.

12 Claims, 2 Drawing Sheets

(51) Int. Cl.

| | |
|---|---|
| *H04H 20/08* | (2008.01) |
| *H04H 20/62* | (2008.01) |
| *H04W 12/06* | (2009.01) |
| *G01M 17/00* | (2006.01) |
| *G08G 1/16* | (2006.01) |
| *G07C 5/00* | (2006.01) |
| *G07C 5/08* | (2006.01) |
| *H04W 76/02* | (2009.01) |
| *H04W 84/12* | (2009.01) |
| *H04W 84/00* | (2009.01) |

(52) U.S. Cl.
CPC .......... *H04W 12/06* (2013.01); *H04W 76/02* (2013.01); *H04W 84/005* (2013.01); *H04W 84/12* (2013.01)

(56) References Cited

U.S. PATENT DOCUMENTS

2015/0019266 A1* 1/2015 Stempora ............... G06Q 40/08
705/4
2015/0098459 A1    4/2015 Lee et al.

FOREIGN PATENT DOCUMENTS

KR    10-2010-0117861 A    11/2010
WO    WO 2013/169011 A1    11/2013

* cited by examiner

DEVICE ENABLING EXCHANGE OF ABNORMAL SIGNAL AMONG VEHICLES VIA WI-FI DIRECT NETWORK, AND CONTROL METHOD THEREFOR

CROSS REFERENCE TO RELATED APPLICATIONS

This application is the National Phase of PCT International Application No. PCT/KR2014/012065, filed on Dec. 9, 2014, which claims priority under 35 U.S.C. 119(e) to U.S. Provisional Application No. 61/913,889, filed on Dec. 9, 2013, all of which are hereby expressly incorporated by reference into the present application.

FIELD OF THE INVENTION

The present invention relates to a device for enabling abnormal signals to be exchanged between vehicles and method for controlling the same.

BACKGROUND ART

Wi-Fi Direct Network is the network capable of enabling Wi-Fi devices to be connected to each other by peer-to-peer without participating in a home network, an office network or a hotspot network, and was proposed by Wi-Fi Alliance (hereinafter abbreviated WFA).

While a vehicle is driven, if abnormality occurs in the driven vehicle, it is necessary to notify such an abnormal state to drivers of other vehicles. If one of the drivers of the other vehicles recognizes the abnormal state, as the corresponding driver performs defensive driving, the possibility of accident occurrence can be lowered and the damage caused by an occurring accident can be reduced.

Currently, a separate communication method capable of exchanging information between vehicles fails to exist. Conventionally, abnormal signals may be exchanged by applying various kinds of wireless communication methods existing previously.

However, in case that an abnormal signal is transmitted between vehicles using a wireless communication, the signal transmission can be performed after establishing a session for the wireless communication in advance. Although wireless communication systems may differ from each other in consumed time, they are similarly required to consume a considerable time to establish the session.

Thus, since an inter-vehicle transmission of an abnormal signal needs to be performed as a transmission of an emergency signal as quickly as possible, the demand for researching & developing such an inter-vehicle transmission of an abnormal signal is increasingly rising.

SUMMARY OF THE INVENTION

The present invention is proposed to meet the aforementioned necessity, and the technical task of the present invention is to a Wi-Fi device and controlling method thereof, by which a signal about an abnormal state of a vehicle can be quickly transmitted before establishing a connection using Wi-Fi Direct.

Technical tasks obtainable from the present invention are non-limited by the above-mentioned technical task. And, other unmentioned technical tasks can be clearly understood from the following description by those having ordinary skill in the technical field to which the present invention pertains.

In a $1^{st}$ technical aspect of the present invention, provided herein is a method of controlling a Wi-Fi device, transmitting an abnormal signal of a vehicle based on Wi-Fi Direct, including the steps of determining an abnormal state of the vehicle, generating vendor specific data based on the determined abnormal state, and transmitting the generated vendor specific data to a different Wi-Fi device by adding the generated vendor specific data to a management frame.

In a $2^{nd}$ technical aspect of the present invention, provided herein is a Wi-Fi device in transmitting an abnormal signal of a vehicle based on Wi-Fi Direct, including a wireless communication unit configured to communicate with a different Wi-Fi device based on the Wi-Fi Direct, a sensing unit configured to determine an abnormal state of the vehicle, and a controller generating vendor specific data based on the determined abnormal state, the controller controlling the wireless communication unit to transmit the generated vendor specific data to the different Wi-Fi device by adding the generated vendor specific data to a management frame.

A Wi-Fi device and method of transmitting a vehicle abnormality signal according to the present invention provide the following effects and/or features.

According to at least one of embodiments of the present invention, since a probe request signal (Probe Request) and a probe response signal (Probe Response) are used without performing association and authentication procedures of a related art Wi-Fi technology, a message can be sent to another vehicle very quickly.

Effects obtainable from the present invention are non-limited by the above mentioned effect. And, other unmentioned effects can be clearly understood from the following description by those having ordinary skill in the technical field to which the present invention pertains.

DETAILED DESCRIPTION OF THE EMBODIMENTS

Figure 1:
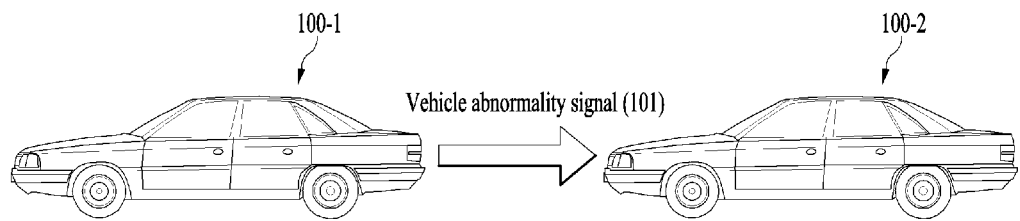
FIG. 1 is a schematic diagram of a situation that an abnormal signal is transceived between vehicles.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In the drawings, a size of each component may be exaggerated for clarity of the corresponding description.

FIG. 1 is a schematic diagram of a situation that an abnormal signal is transceived between vehicles.

While a user is driving a vehicle, it may be necessary to transceive information with a different vehicle currently driven. In doing so, if an abnormal state of the different car is delivered to the user in advance, since the user can prepare for a preemptive accident prevention or a defensive driving, driving safety can be further enhanced.

According to one embodiment of the present invention, as shown in FIG. 1, if abnormality occurs in a leading car 100-1, it is proposed to deliver a vehicle abnormality signal 101 to a following car 100-2 as quickly as possible. The vehicle abnormality signal 101 may include at least one of a brake failure, an engine system failure, a driver state failure, a powertrain failure, a turn signal light failure, an emergency notification, an abnormal vehicle driving, a vehicle fire notification and the like, by which examples of the vehicle abnormality signal are non-limited.

Although various methods may be available for such a method of transceiving information between vehicles, a method according to one embodiment of the present invention is proposed to use Wi-Fi wireless communication corresponding to one of the wireless communication technologies used frequently in these days. Wi-Fi technology basically uses a communication between an AP and a client. And, Wi-Fi Direct technology has been developed and used to enable a communication between Wi-Fi devices without an access point (AP). Hence, if Wi-Fi Direct technology is used, it may be able to deliver an abnormal signal using a wireless communication between Wi-Fi devices installable in vehicles without separate AP.

Figure 2:
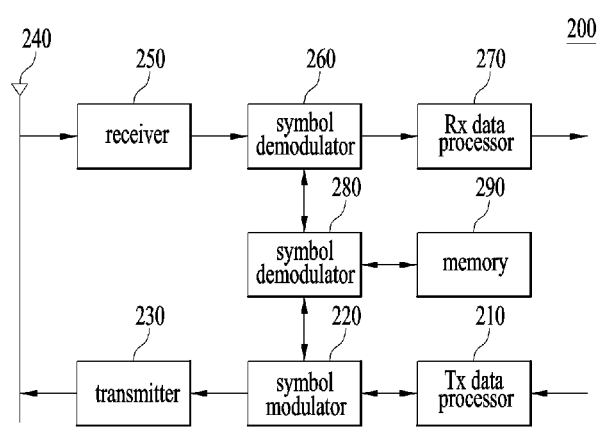
FIG. 2 is a block diagram for a configuration of a device 200 (hereinafter named Wi-Fi device) configured to perform communications using Wi-Fi Direct.

FIG. 2 is a block diagram for a configuration of a device 200 (hereinafter named Wi-Fi device) configured to perform communications using Wi-Fi Direct. As mentioned in the foregoing description with reference to FIG. 1, each of the vehicles 100-1 and 100-2 capable of transceiving the vehicle abnormality signal may be equipped with the Wi-Fi direct device.

Referring to FIG. 2, a Wi-Fi device 200 may include a transmitted (Tx) data processor 210, a symbol modulator 220, a transmitter 230, a transceiving antenna 240, a receiver 250, a symbol demodulator 260, a received data processor 270, a processor 280 and a memory 290. Although a single transceiving antenna 240 is shown in the drawing, a plurality of transceiving antennas may be included. Therefore, the Wi-Fi device 200 according to the present invention supports an MIMO (multiple input multiple output) system. And, the Wi-Fi device 200 according to the present invention can support both SU-MIMO (single user-MIMO) and MU-MIMO (multi user-MIMO) systems.

The transmitted data processor 210 receives traffic data, performs coding on the received traffic data by formatting, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 230. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 230 receives the stream of the symbols, converts the received stream to at least one or more analog signals and then generates a downlink signal suitable for a transmission on a radio channel by additionally adjusting the analog signals (e.g., amplification, filtering, frequency upconverting, etc.). If so, the transmitting antenna 240 transmits the generated signal to another device.

Meanwhile, the receiving antenna 240 receives a signal from another device and then provides the received signal to the receiver 250. Subsequently, the receiver 250 adjusts the received signal (e.g., filtering, amplification and frequency downconverting) and then obtains samples by digitizing the adjusted signal. The symbol demodulator 260 demodulates the received pilot symbols and then provides them to the processor 280 for channel estimation.

Moreover, the symbol demodulator 260 receives a frequency response estimated value from the processor 280, obtains data symbol estimated values (i.e., estimated values of the transmitted data symbols) by performing data demodulation on the received data symbols, and then provides the data symbol estimated values to the received (Rx) data processor 270. Subsequently, the received data processor 270 reconstructs the transmitted traffic data by performing demodulation (i.e., symbol demapping), deinterleaving and decoding on the data symbol estimated values.

The processing by the symbol demodulator 260 and the received data processor 270 is complementary to the processing by the symbol modulator 220 and the transmitted data processor 210.

The processor 280 directs operations (e.g., control, adjustment, management, etc.) in the Wi-Fi device 200. The processor 280 may be connected to the memory unit 290 configured to store program codes and data. The memory 290 is connected to the processor 280 to store operating systems, applications and general files.

The processor 280 may be called one of a controller, a microcontroller, a microprocessor, a microcomputer and the like. Meanwhile, the processor 280 may be implemented using hardware, firmware, software and/or any combinations thereof. In case of implementing an embodiment of the present invention using hardware, the processor 280 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, the W-Fi device 200 in the embodiments of the present invention may further include a sensing unit (not shown in the drawing) configured to sense or determine an abnormal signal of a vehicle. The Wi-Fi device 200 is provided to each vehicle and will be used for a transmission of a vehicle abnormality signal 101 between vehicles.

Meanwhile, in case of implementing the embodiments of the present invention using firmware or software, the firmware or software may be configured to include modules, procedures, and/or functions for performing the functions and/or operations of the present invention. And, the firmware or software configured to implement the present invention is loaded on the processor 280 or saved in the memory 290 to be driven by the processor 280.

In addition to the components shown in FIG. 2, the Wi-Fi device 200 according to the present invention can further include various components if necessary. For instance, if the Wi-Fi device 200 is a mobile user equipment, it may further include such components as an A/V (audio/video) input unit configured to receive inputs of audio and video signals by including a camera, a microphone and the like, a user input unit configured to receive an input of a user's operation control by including buttons, touch sensors, a keypad and the like, a sensing unit configured to detect such current states of a mobile terminal as a location, a direction, an acceleration, a deceleration, a presence or non-presence of a contact with a user and the like, an output unit configured to generate outputs related to a visual sense, an auditory sense, a haptic sense or the like by including a display, a speaker, a haptic motor and the like, an interface unit configured to connect to external devices by including a wired/wireless headset port, an external charger port, an earphone port, a memory card port and the like, a power supply unit configured to supply powers required for operations of the respective components by being provided with an external or internal power under the control of a processor, and the like.

An embodiment related to a wireless communication method implemented in the above-configured device shall be described in detail with reference to the accompanying drawing as follows.

For clarity of the following description, assume that the Wi-Fi device 200 according to the present invention includes at least one of the components shown in FIG. 2.

In the following description, a flowchart for establishing a wireless communication session between Wi-Fi devices using Wi-Fi Direct technology shall be described in detail with reference to FIG. 3.

Figure 3:
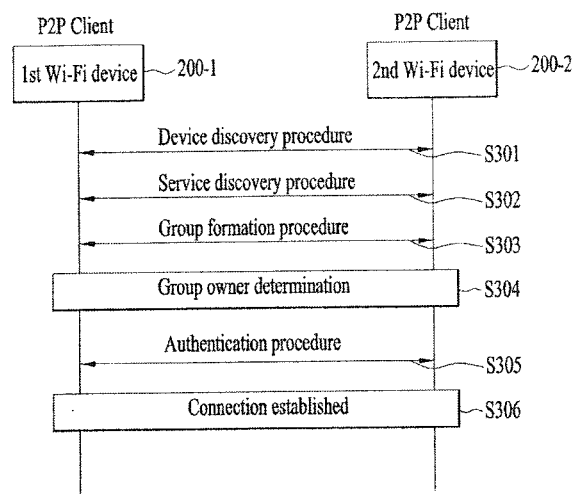
FIG. 3 is a flowchart for configuring a connection between two Wi-Fi devices using Wi-Fi Direct technology.

FIG. 3 is a flowchart for configuring a connection between two Wi-Fi devices using Wi-Fi Direct technology.

Wi-Fi device exchanges information in a manner of transmitting and receiving management frames through the following procedures in order to exchange a presence or non-presence and a service support information between devices for mutual connection configuration. In doing so, a $1^{st}$ Wi-Fi device 200-1 and a $2^{nd}$ Wi-Fi device 200-2 may be provided to a leading vehicle 100-1 and a following vehicle 100-2, respectively.

Referring to FIG. 3, a 1st Wi-Fi device 200-1 supportive of Wi-Fi Direct and a 2nd Wi-Fi device 200-2 supportive of Wi-Fi Direct perform a device discovery procedure S301, a service discovery procedure S302, a group formation procedure S303, a group owner determination S304 and an authentication procedure S305, thereby achieving mutual connection.

The device discovery procedure S301 is the procedure for discovering a device supportive of Wi-Fi Direct technology. One of the $1^{st}$ Wi-Fi device 200-1 and the $2^{nd}$ Wi-Fi device 200-2 can perform a device discovery by sensing a beacon signal received from the other.

The above-mentioned process is described in detail as follows.

First of all, the device discovery procedure S301 uses a probe request frame and a probe response frame for an information exchange between Wi-Fi devices. The $1^{st}$ Wi-Fi device 200-1 intending to discover another nearby Wi-Fi device transmits a probe request frame to surroundings and then waits for a reception of a probe response frame. If the $2^{nd}$ Wi-Fi device 200-2 existing nearby receives the probe request frame, the $2^{nd}$ Wi-Fi device 200-2 generates a probe response frame and then transmits the generated probe response frame to the $1^{st}$ Wi-Fi device 200-1, whereby the device discovery procedure S301 is performed.

The service discovery procedure S302 is the procedure for exchanging service information between devices. In this case, the service information is an attribute information of a device and may include at least one of a device type information, a group owner request information, an internet access information and an environment configuration information. The service information may include P2P attribute ID Definitions defined in Wi-Fi Direct as Table 1 in the following.

TABLE 1

| Attribute ID | Note |
| --- | --- |
| 0 | Status |
| 1 | Minor Reason Code |
| 2 | P2P Capability |
| 3 | P2P Device ID |
| 4 | Group Owner Intent |
| 5 | Configuration Timeout |
| 6 | Listen Channel |
| 7 | P2P Group BSSID |
| 8 | Extended Listen Timing |
| 9 | Intended P2P Interface Address |
| 10 | P2P Manageability |
| 11 | Channel List |
| 12 | Notice of Absence |
| 13 | P2P Device Info |
| 14 | P2P Group Info |
| 15 | P2P Group ID |
| 16 | P2P Interface |
| 17 | Operating Channel |
| 18 | Invitation Flags |
| 19-220 | Reserved |
| 221 | Vendor Specific Attribute |
| 222-255 | Reserved |

For the exchange of service information provided by each device, the service discovery procedure S302 uses a service discovery request frame and a service discovery response frame. The service discovery request frame and the service discovery response frame are generated using GAS (generic advertisement service) initial request frame and GAS initial response frame of IEEE 802.11u, respectively.

As a procedure for forming a group of Wi-Fi devices to connect, the group formation procedure S303 is the procedure for exchanging information necessary for a group formation. In this procedure, the respective devices can exchange information on a group formation. And, the exchanged information may include a group owner intent value.

If Wi-Fi direct network is used, it is able to form a wireless communication group between Wi-Fi devices connected to a network. In this case, regarding a network connected structure, one Wi-Fi device plays a role as an owner and a plurality of other Wi-Fi devices play roles as clients, whereby a wireless communication group can be formed.

In the step S304, the $1^{st}$ Wi-Fi device 200-1 and the $2^{nd}$ Wi-Fi device 200-2 compare the exchanged information. Hence, one of the $1^{st}$ Wi-Fi device 200-1 and the $2^{nd}$ Wi-Fi device 200-2 can be determined as a group owner and the other can be determined as a group client. Since a process for determining a group owner and a group client is not related to an embodiment of the present invention, its details shall be omitted from the following description.

After an authentication procedure using WPS (Wi-Fi protected setup) has been performed in the step S305, a connection is then established between the $1^{st}$ Wi-Fi device 200-1 and the $2^{nd}$ Wi-Fi device 200-2 [S306].

The above procedure shows a general Wi-Fi Direct access procedure. Through the connection configured after finishing all the procedures mentioned in the above description, specific services between two vehicles (i.e., two Wi-Fi devices) are available.

For instance, although the leading vehicle 100-1 senses an abnormal state of the vehicle and then desires to make a warning by notifying the sensed abnormal state to a nearby vehicle, only if all the above-mentioned general procedures are completed, a corresponding connection can be configured. Hence, it is able to transmit abnormality of the vehicle state based on the configured connection.

Yet, according to the general procedure mentioned in the above description, as a time is delayed in finishing all the access procedure, it is necessary to wait for a long time to perform a simple message transmission and reception.

Therefore, according to one embodiment of the present invention, it is proposed to a control method for delivering urgent information before the configuration (or setup) of the connection.

According to one embodiment of the present invention, in order to provide a vehicle abnormality information service, it may be able to consider an IE (information element) system used by Wi-Fi. Unlike the above-described general method of the related art, if a message is transceived using IE, although the general Wi-Fi access procedure shown in FIG. 3 is not performed completely, when a management frame is transmitted in a prescribed procedure, since a corresponding message information can be sent by being carried on the management frame, it is advantageous in that it is not necessary to wait until finishing the entire access procedure. The management frame may include such frames transceived in the device discovery procedure S301 as the probe request frame and the probe response frame or such frames transceived in the service discovery procedure S302 as the service discovery request frame and the service discovery response frame.

Wi-Fi technology permits Vendor Specific data usage and gives numbers, as shown in Table 2, to be used in the technology established by CCC (Car Connectivity Consortium).

TABLE 2

| Field | Size (octet) | Value | Description |
|---|---|---|---|
| Element ID | 1 | 0xDD | 802.11 Vendor specific usage |
| Length | 1 | Variable | The length of sum of following elements |
| OUI (Organizationally Unique Identifier) | 3 | 04-DF-69 | CCC specific OUI assigned by IEEE |
| OUI Type | 1 | | OUI type |
| Subelements | Variable | | One or more subelements can follow |

As defined in Table 2, when a communication between a vehicle for a vehicle service and a mobile terminal is performed, it is able to define a new service by denoting OUI (Organizationally Unique Identifier) by "04-DF-69".

Usages of the fields "OUI Type" and "Subelements" included in Table 2 are described as follows.

The field "OUI Type" is defined as Table 3 in the following.

TABLE 3

| OUI Type (Decimal) | Note |
|---|---|
| 0-9 | Reserved |
| 10 | MirrorLink 1.2 |
| 11-255 | Reserved |

A value of the OUI field is not set to 0 to 9. If the value is denoted by 10, it indicates MirrorLink version 1.2.

The field "Subelement" included in Table 1 is defined as Table 4 in the following.

TABLE 4

| Field | Size (octet) | Value | Description |
|---|---|---|---|
| Subelement ID | 1 | | Identifier which Represents the type of subelement. (Table 3) |
| Length | 1 | Variable | The length of sum of following Elements |
| Subelement body field | variable | | The value of subelement. |

The field "Subelement ID" is the information for identifying a type of the corresponding "Subelement" and follows the format shown in Table 5 as follows.

TABLE 5

| Subelement ID (Decimal) | Note |
|---|---|
| 0 | MirrorLink UPnP device information |
| 1 | Internet Accessibility |
| 2-255 | Reserved |

The "Subelement ID" value '0' is used to represent MirrorLink UPnP (Universal Plug and Play) device information, while the "Subelement ID" value '1' is used to indicate Internet Accessibility information. According to one embodiment of the present invention, it is proposed to define a format of new "Subelement" to transmit a vehicle abnormality signal. The field "Subelement ID" according to one embodiment of the present invention may be modified as Table 6 in the following.

TABLE 6

| Subelement ID (Decimal) | Note |
|---|---|
| 0 | MirrorLink UPnP device information |
| 1 | Internet Accessibility |
| 2 | Vehicle Information |
| 3-255 | Reserved |

According to the example shown in Table 6, the "Subelement ID" value '2' is defined as "Subelement" to transmit a vehicle abnormality signal. In this case, the field "Subelement" shown in Table 4 may be modified as Table 7 in the following.

TABLE 7

| Field | Size (octet) | Value | Description |
|---|---|---|---|
| Subelement ID | 1 | 2 | Represents vehicle abnormality signal Subelement |
| Length | 1 | 4 | Length of vehicle abnormality signal |
| Subelement body field | 4 | | Content of vehicle abnormality signal |

According to the example shown in table 7, a length of "Subelement" related to a vehicle abnormality signal is set to 4 octets, by which the length is non-limited. A structure of such a type length value (Type, Length, Value) may be defined based on the P2P (Peer to Peer) standard.

The content of the vehicle abnormality signal in the "Subelement" related to the vehicle abnormality signal shown in Table 7 is shown in Table 8 in the following. According to the example shown in Table 8, a value '0b0' of each information indicates absence of abnormality.

TABLE 8

| Bits | Name | Interpretation |
|---|---|---|
| 16:0 | Vehicle identification number | VIN: Vehicle Identification Number |
| 17 | Brake abnormality | 0b1: Brake Problem |
| 18 | Engine system abnormality | 0b1: Engine Problem |
| 19 | Driver status abnormality | 0b1: Driver status abnormality |
| 20 | Powertrain abnormality | 0b1: Powertrain problem |
| 21 | Turn signal abnormality | 0b1: Signal Problem |
| 22 | Emergency notification | 0b1: Emergency Notification |
| 23 | Abnormal vehicle driving | 0b1: Driving normality |
| 24 | Vehicle fire notification | 0b1: Fire in the vehicle |
| 31:25 | Reserved | Reserved for additional use |

Table 8 shows one example to show information indicated by each of 0 to 32 bits (4 octets) configuring "Subelement" related to a vehicle abnormality signal. In particular, using at least one bit included in the "Subelement" related to the vehicle abnormality signal, a vehicle abnormality signal 101 is represented. And, such "Subelement" can be transmitted to another vehicle through a management frame by being included in IE.

In particular, the "Subelement" including the vehicle abnormality signal 101 may be included in: (1) the probe request frame and the probe response frame transceived between the 1$^{st}$ Wi-Fi device 200-1 and the 2$^{nd}$ Wi-Fi device 200-2 in the device discovery procedure S301; or (2) the service request frame and the service response frame transceived between the 1$^{st}$ Wi-Fi device 200-1 and the 2$^{nd}$ Wi-Fi device 200-2 in the service discovery procedure S302.

The respective informations included in the "Subelement" related to the vehicle abnormality signal are described in detail as follows.

VIN (Vehicle Identification Number): an identification number of a vehicle is denoted by 17-digit numerals and alphabets and vehicle identification numbers of various types are available according to the example of the present invention.

Brake abnormality: Vehicle senses a presence or non-presence of abnormality of a brake. If abnormality is sensed, the sensed abnormality is transmitted by being denoted by 1.

Engine system abnormality: Vehicle checks an engine state. If abnormality is sensed, the sensed abnormality is transmitted by being denoted by 1.

Driver status abnormality: Vehicle is equipped with a driver status check function. If it is sensed that a driver is in an accident inducing state (e.g., driver's drowsy driving, driver's drunk driving, driver's heart attack, etc.), the sensed state is transmitted by being denoted by 1.

Powertrain abnormality: If overall abnormality of a powertrain of a vehicle is sensed, the sensed abnormality is transmitted by being denoted by 1.

Turn signal abnormality: If a turn signal light of a vehicle fails, the sensed failure is transmitted by being denoted by 1.

Emergency notification: When a vehicle or a driver intends to indicate an emergency due to various reasons, the emergency notification is transmitted by being denoted by 1.

Abnormal vehicle driving: When a vehicle is in an abnormal state (e.g., abrupt lane departure, slipping, etc.) on a road, the abnormal state is transmitted by being denoted by 1.

Vehicle fire notification: In case of fire inside a vehicle, the fire outbreak is transmitted by being denoted by 1.

Figure 4:
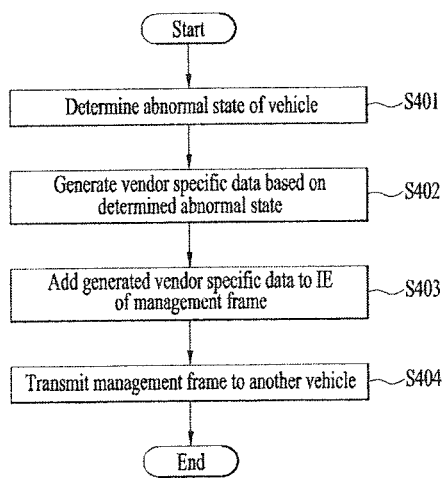
FIG. 4 is a flowchart of a vehicle abnormality signal transmitting process performed in a Wi-Fi device 200 according to one embodiment of the present invention.

FIG. 4 is a flowchart of a vehicle abnormality signal transmitting process performed in a Wi-Fi device 200 according to one embodiment of the present invention.

Referring to FIG. 4, in a step S401, the Wi-Fi device 200 determines a vehicle abnormality state. In doing so, the Wi-Fi device 200 receives information on an information on an abnormal state of a vehicle from another device of the vehicle and may be then able to make a determination using the received information.

In a step S402, the Wi-Fi device 200 generates vendor specific data based on the determined vehicle abnormality state. The vendor specific data may include "Subelement" including a vehicle abnormality signal (refer to Table 8). In this case, a type length value (TLV) of the "Subelement" may refer to the description with reference to Table 7.

In a step S403, the "Subelement" 200 can add the generated vendor specific data to an IE of a management frame. In this case, the management frame may include at least one of a probe request frame, a probe response frame, a service request frame and a service response frame.

In a step S404, the "Subelement" can transmit the management frame having the vendor specific data added thereto to a different vehicle (i.e., a different Wi-Fi device provided to the different vehicle).

Having received the vehicle abnormality information, the different vehicle may guide a driver of the corresponding vehicle to perform a defensive driving by outputting the vehicle abnormality information to the driver.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a Wi-Fi device in a vehicle, the method comprising:
determining, via a controller of the Wi-Fi device, an abnormal state of the vehicle;
adding, via the controller, vendor specific data in a management frame to be transmitted to a different Wi-Fi device in a different vehicle via Wi-Fi Direct based on the determined abnormal state;
transmitting, via a wireless communication unit of the Wi-Fi device, the generated vendor specific data to the different Wi-Fi device,
wherein the management frame comprises at least one of a probe request frame, a probe response frame, a service request frame and a service response frame, and
wherein the management frame is transmitted before an authenticated connection is established between the Wi-Fi device and the different Wi-Fi device.

2. The method of claim 1, wherein the vendor specific data is included in an IE (information element) of the management frame.

3. The method of claim 2, wherein the IE of the management frame further includes a "Subelement" field, and
wherein the "Subelement" field includes a vehicle abnormality information indicating the determined vehicle abnormal state.

4. The method of claim 3, wherein the vehicle abnormality information comprises at least one of a brake abnormality, an engine system abnormality, a driver status abnormality, a powertrain abnormality, a turn signal abnormality, an emergency notification, an abnormal vehicle driving, and a vehicle fire notification.

5. The method of claim 3, wherein the "Subelement" comprises a "Subelement ID" field including attribute information of the "Subelement", a length field including length information, and a "Subelement body" field including vehicle abnormality information.

6. The method of claim 1, wherein the management frame is generated using a GAS (generic advertisement service) initial request frame and a GAS initial response frame defined in IEEE 802.11u.

7. A Wi-Fi device in a vehicle, comprising:
a wireless communication unit configured to communicate with a different Wi-Fi device in a different vehicle based on Wi-Fi Direct;
a sensing unit configured to determine an abnormal state of the vehicle; and
a controller configured to:
add vendor specific data in a management frame to be transmitted to the different Wi-Fi device via the Wi-Fi Direct based on the determined abnormal state,
transmit the generated vendor specific data to the different Wi-Fi device via the wireless communication unit,
wherein the management frame comprises at least one of a probe request frame, a probe response frame, a service request frame and a service response frame, and
wherein the management frame is transmitted before an authenticated connection is established between the Wi-Fi device and the different Wi-Fi device.

8. The Wi-Fi device of claim 7, wherein the vendor specific data is included in an IE (information element) of the management frame.

9. The Wi-Fi device of claim 8, wherein the IE of the management frame further includes a "Subelement" field, and
wherein the "Subelement" field includes a vehicle abnormality information indicating the determined vehicle abnormal state.

10. The Wi-Fi device of claim 9, wherein the vehicle abnormality information comprises at least one of a brake abnormality, an engine system abnormality, a driver status abnormality, a powertrain abnormality, a turn signal abnormality, an emergency notification, an abnormal vehicle driving, and a vehicle fire notification.

11. The Wi-Fi device of claim 9, wherein the "Subelement" comprises a "Subelement ID" field including an attribute information of the "Subelement", a length field including length information, and a "Subelement body" field including vehicle abnormality information.

12. The Wi-Fi device of claim 7, wherein the management frame is generated using a GAS (generic advertisement service) initial request frame and a GAS initial response frame defined in IEEE 802.11u.

* * * * *